US008065710B2

(12) United States Patent
Malik

(10) Patent No.: US 8,065,710 B2
(45) Date of Patent: Nov. 22, 2011

(54) APPARATUSES AND METHODS FOR INTERACTIVE COMMUNICATION CONCERNING MULTIMEDIA CONTENT

(75) Inventor: Dale Malik, Atlanta, GA (US)

(73) Assignee: AT&T Intellectual Property I, L.P., Atlanta, GA (US)

( * ) Notice: Subject to any disclaimer, the term of this patent is extended or adjusted under 35 U.S.C. 154(b) by 846 days.

(21) Appl. No.: 11/368,223

(22) Filed: Mar. 2, 2006

(65) Prior Publication Data

US 2007/0208766 A1    Sep. 6, 2007

(51) Int. Cl.
*H04N 7/173* (2011.01)
*H04N 7/16* (2011.01)
*H04N 7/00* (2011.01)
*H04N 11/00* (2006.01)
*H04N 5/445* (2011.01)
*H04N 9/74* (2006.01)

(52) U.S. Cl. ........ 725/109; 725/110; 725/135; 348/468; 348/563; 348/586

(58) Field of Classification Search .............. 725/1–153; 715/233
See application file for complete search history.

(56) References Cited

U.S. PATENT DOCUMENTS

| | | |
|---|---|---|
| 3,798,610 A | 3/1974 | Bliss |
| 3,886,302 A | 5/1975 | Kosco |
| 4,130,833 A | 12/1978 | Chomet |
| 4,258,386 A | 3/1981 | Cheung |
| 4,264,925 A | 4/1981 | Freeman |
| 4,361,851 A | 11/1982 | Asip |
| 4,488,179 A | 12/1984 | Kruger |
| 4,566,030 A | 1/1986 | Nickerson |
| 4,567,591 A | 1/1986 | Gray |
| 4,573,072 A | 2/1986 | Freeman |
| 4,598,288 A | 7/1986 | Yarbrough |
| 4,688,248 A | 8/1987 | Tomizawa |

(Continued)

FOREIGN PATENT DOCUMENTS

WO    9414284    6/1994

OTHER PUBLICATIONS

R. Schroeter, J. Hunter, and D. Kosovic. "Vannotea—A Collaborative Video Indexing, Annotation and Discussion System for Broadband Networks," Knowledge Markup and Semantic Annotation Workshop, K-CAP 2003. Sanibel, Florida. Oct. 2003. Accessed on Jul. 22, 2009 at http://www.itee.uq.edu.au/~eresearch/papers/2003/schroeter-kcap03.pdf.*

(Continued)

*Primary Examiner* — Brian Pendleton
*Assistant Examiner* — Ryan Stronczer
(74) *Attorney, Agent, or Firm* — Toler Law Group

(57) ABSTRACT

An apparatus for use with an output device coupled to one or more sources of multimedia content comprises an operator interface, a record generator and a network interface. The operator interface receives information responsive to a user's observation of a segment of multimedia content. The record generator creates a record that identifies the segment of multimedia content and includes information responsive to the user's observation of the segment of multimedia content. The network interface communicates presence information. The apparatus generates a record that provides a mechanism for interactive and collaborative communication between interested parties with access to a device that can access and synchronize the presentation of the segment of multimedia content and the user information.

25 Claims, 7 Drawing Sheets

U.S. PATENT DOCUMENTS

| | | | |
|---|---|---|---|
| 4,689,661 A | 8/1987 | Barbieri | |
| 4,698,670 A | 10/1987 | Matty | |
| 4,720,873 A | 1/1988 | Goodman | |
| 4,816,904 A | 3/1989 | McKenna | |
| 4,862,268 A | 8/1989 | Campbell | |
| 4,890,322 A | 12/1989 | Russell | |
| 4,912,552 A | 3/1990 | Allison | |
| 5,010,585 A | 4/1991 | Garcia | |
| 5,010,858 A | 4/1991 | Schierling | |
| 5,038,211 A | 8/1991 | Hallenbeck | |
| 5,046,090 A | 9/1991 | Walker | |
| 5,046,092 A | 9/1991 | Walker | |
| 5,055,924 A | 10/1991 | Skutta | |
| 5,161,019 A | 11/1992 | Emanuel | |
| 5,173,900 A | 12/1992 | Miller | |
| 5,181,438 A | 1/1993 | Wellman | |
| 5,191,645 A | 3/1993 | Carlucci | |
| 5,208,665 A | 5/1993 | McCalley | |
| 5,247,347 A | 9/1993 | Litteral | |
| 5,249,044 A | 9/1993 | Von Kohorn | |
| 5,260,778 A | 11/1993 | Kauffman | |
| 5,262,860 A | 11/1993 | Fitzpatrick | |
| 5,287,181 A | 2/1994 | Holman | |
| 5,335,277 A | 8/1994 | Harvey | |
| 5,339,315 A | 8/1994 | Maeda | |
| 5,343,240 A | 8/1994 | Yu | |
| 5,357,276 A | 10/1994 | Banker | |
| 5,374,951 A | 12/1994 | Welsh | |
| 5,390,027 A | 2/1995 | Henmi | |
| 5,404,393 A | 4/1995 | Remillard | |
| 5,444,499 A | 8/1995 | Saitoh | |
| 5,446,490 A | 8/1995 | Blahut | |
| 5,446,919 A | 8/1995 | Wilkins | |
| 5,481,542 A | 1/1996 | Logston | |
| 5,483,277 A | 1/1996 | Granger | |
| 5,502,499 A | 3/1996 | Birch | |
| 5,539,451 A | 7/1996 | Carey | |
| 5,539,822 A | 7/1996 | Lett | |
| 5,541,917 A | 7/1996 | Farris | |
| 5,555,838 A | 9/1996 | Bergman | |
| 5,557,320 A | 9/1996 | Krebs | |
| 5,557,338 A | 9/1996 | Maze | |
| 5,585,838 A | 12/1996 | Lawler | |
| 5,585,858 A | 12/1996 | Harper | |
| 5,592,477 A | 1/1997 | Farris | |
| 5,600,775 A * | 2/1997 | King et al. | 715/203 |
| 5,608,448 A | 3/1997 | Smoral | |
| 5,629,733 A | 5/1997 | Youman | |
| 5,640,192 A | 6/1997 | Garfinkle | |
| 5,648,824 A | 7/1997 | Dunn | |
| 5,661,517 A | 8/1997 | Budow | |
| 5,721,829 A | 2/1998 | Dunn | |
| 5,779,549 A | 7/1998 | Walker | |
| 5,781,246 A | 7/1998 | Alten | |
| 5,784,683 A | 7/1998 | Sistanizadeh | |
| 5,796,426 A | 8/1998 | Gullichsen | |
| 5,805,154 A | 9/1998 | Brown | |
| 5,818,438 A | 10/1998 | Howe et al. | 345/327 |
| 5,822,123 A | 10/1998 | Davis | |
| 5,828,420 A | 10/1998 | Marshall | |
| 5,847,771 A | 12/1998 | Cloutier | |
| 5,864,823 A | 1/1999 | Levitan | |
| 5,867,205 A | 2/1999 | Harrison | |
| 5,880,768 A | 3/1999 | Lemmons | |
| 5,880,769 A | 3/1999 | Nemirofsky | |
| 5,892,508 A | 4/1999 | Howe | |
| 5,931,908 A | 8/1999 | Gerba | |
| 5,977,964 A | 11/1999 | Williams | |
| 5,990,927 A | 11/1999 | Hendricks | |
| 6,005,561 A | 12/1999 | Hawkins | |
| 6,008,802 A | 12/1999 | Iki | |
| 6,012,983 A | 1/2000 | Walker | |
| 6,018,764 A | 1/2000 | Field | |
| 6,025,837 A | 2/2000 | Matthews | |
| 6,100,883 A | 8/2000 | Hoarty | |
| 6,108,042 A | 8/2000 | Adams | |
| 6,113,495 A | 9/2000 | Walker | |
| 6,157,413 A | 12/2000 | Hanafee | |
| 6,201,536 B1 | 3/2001 | Hendricks | |
| 6,213,880 B1 | 4/2001 | Sim | |
| 6,230,172 B1 * | 5/2001 | Purnaveja et al. | 715/205 |
| 6,240,555 B1 | 5/2001 | Shoff | |
| 6,244,957 B1 | 6/2001 | Walker | |
| 6,256,785 B1 | 7/2001 | Klappert | |
| 6,317,885 B1 | 11/2001 | Fries | |
| 6,324,544 B1 | 11/2001 | Alam | |
| 6,324,694 B1 | 11/2001 | Watts | |
| 6,327,574 B1 | 12/2001 | Kramer | |
| 6,357,042 B2 | 3/2002 | Srinivasan et al. | 725/32 |
| 6,418,556 B1 | 7/2002 | Bennington | |
| 6,419,137 B1 | 7/2002 | Marshall | |
| 6,463,207 B1 | 10/2002 | Abecassis | |
| 6,463,585 B1 | 10/2002 | Hendricks | |
| 6,468,155 B1 | 10/2002 | Zucker | |
| 6,477,579 B1 | 11/2002 | Kunkel | |
| 6,490,725 B2 * | 12/2002 | Kikinis | 725/87 |
| 6,491,651 B1 * | 12/2002 | Leahy et al. | 601/40 |
| 6,502,242 B1 | 12/2002 | Howe | |
| 6,535,889 B1 | 3/2003 | Headrick | |
| 6,557,006 B1 | 4/2003 | Headrick | |
| 6,564,246 B1 * | 5/2003 | Varma et al. | 709/205 |
| 6,567,982 B1 | 5/2003 | Howe | |
| 6,615,408 B1 | 9/2003 | Kaiser | |
| 6,634,942 B2 | 10/2003 | Walker | |
| 6,676,522 B2 | 1/2004 | Rowe | |
| 6,718,551 B1 | 4/2004 | Swix | |
| 6,738,978 B1 | 5/2004 | Hendricks | |
| 6,756,997 B1 | 6/2004 | Ward | |
| 6,760,916 B2 | 7/2004 | Holtz | |
| 6,800,029 B2 | 10/2004 | Rowe | |
| 6,826,775 B1 | 11/2004 | Howe | |
| 6,850,252 B1 | 2/2005 | Hoffberg | |
| 6,898,762 B2 | 5/2005 | Ellis | |
| 6,967,566 B2 | 11/2005 | Weston | |
| 7,100,183 B2 | 8/2006 | Kunkel et al. | |
| 7,237,253 B1 | 6/2007 | Blackketter | |
| 7,249,321 B2 | 7/2007 | Bushey | |
| 7,266,835 B2 | 9/2007 | Halbert | |
| 7,284,032 B2 * | 10/2007 | Weber | 709/204 |
| 7,293,276 B2 | 11/2007 | Phillips | |
| 7,337,457 B2 | 2/2008 | Pack | |
| 7,882,530 B2 * | 2/2011 | Ducheneaut et al. | 725/80 |
| 2001/0054134 A1 | 12/2001 | Nagatomo et al. | |
| 2002/0056093 A1 | 5/2002 | Kunkel | |
| 2002/0069132 A1 | 6/2002 | Perkes | |
| 2002/0083464 A1 | 6/2002 | Tomsen | |
| 2002/0083469 A1 | 6/2002 | Jeannin | |
| 2002/0087402 A1 | 7/2002 | Zustak | |
| 2002/0138561 A1 | 9/2002 | Chatfield et al. | |
| 2002/0147984 A1 | 10/2002 | Tomsen | |
| 2002/0147988 A1 | 10/2002 | Nakano | |
| 2002/0156870 A1 | 10/2002 | Boroumand | |
| 2003/0005448 A1 * | 1/2003 | Axelsson et al. | 725/58 |
| 2003/0018969 A1 | 1/2003 | Humpleman | |
| 2003/0067554 A1 | 4/2003 | Klarfeld et al. | |
| 2003/0070167 A1 | 4/2003 | Holtz | |
| 2003/0088875 A1 * | 5/2003 | Gay et al. | 725/88 |
| 2003/0093790 A1 * | 5/2003 | Logan et al. | 725/38 |
| 2003/0110171 A1 | 6/2003 | Ozer | |
| 2003/0110499 A1 | 6/2003 | Knudson | |
| 2003/0145323 A1 | 7/2003 | Hendricks | |
| 2003/0149975 A1 | 8/2003 | Eldering | |
| 2003/0163828 A1 | 8/2003 | Agnihotri | |
| 2003/0182567 A1 | 9/2003 | Barton | |
| 2003/0182663 A1 * | 9/2003 | Gudorf et al. | 725/110 |
| 2003/0204847 A1 | 10/2003 | Ellis | |
| 2003/0208754 A1 | 11/2003 | Sridhar | |
| 2003/0233650 A1 * | 12/2003 | Zaner et al. | 725/32 |
| 2003/0233656 A1 | 12/2003 | Sie | |
| 2003/0235407 A1 * | 12/2003 | Lord | 386/96 |
| 2004/0003402 A1 | 1/2004 | McKenna | |
| 2004/0006509 A1 | 1/2004 | Mannik | |
| 2004/0012717 A1 * | 1/2004 | Sprague et al. | 348/564 |
| 2004/0045028 A1 | 3/2004 | Harris | |
| 2004/0049785 A1 | 3/2004 | Grzeczkowski et al. | |
| 2004/0098754 A1 * | 5/2004 | Vella et al. | 725/135 |
| 2004/0111742 A1 | 6/2004 | Hendricks | |

| | | | |
|---|---|---|---|
| 2004/0122731 A1 | 6/2004 | Mannik | |
| 2004/0163101 A1 | 8/2004 | Swix | |
| 2004/0168188 A1 | 8/2004 | Bennington | |
| 2004/0194138 A1 | 9/2004 | Boylan | |
| 2004/0220858 A1 | 11/2004 | Maggio | |
| 2004/0235567 A1 | 11/2004 | Chatani | |
| 2004/0243470 A1 | 12/2004 | Ozer | |
| 2004/0243623 A1 | 12/2004 | Ozer | |
| 2004/0261127 A1 | 12/2004 | Freeman | |
| 2005/0021403 A1 | 1/2005 | Ozer et al. | |
| 2005/0086688 A1 | 4/2005 | Omoigui | |
| 2005/0091111 A1 | 4/2005 | Green | |
| 2005/0097599 A1 | 5/2005 | Plotnick | |
| 2005/0108776 A1 | 5/2005 | Carver et al. | |
| 2005/0114906 A1 | 5/2005 | Hoarty | |
| 2005/0132401 A1* | 6/2005 | Boccon-Gibod et al. | 725/34 |
| 2005/0196139 A1 | 9/2005 | Blackketter | |
| 2005/0204030 A1 | 9/2005 | Koch | |
| 2005/0204385 A1 | 9/2005 | Sull | |
| 2005/0216932 A1 | 9/2005 | Danker | |
| 2005/0235318 A1 | 10/2005 | Grauch | |
| 2005/0251820 A1 | 11/2005 | Stefanik | |
| 2005/0262530 A1* | 11/2005 | Ruetschi et al. | 725/35 |
| 2005/0262542 A1* | 11/2005 | DeWeese et al. | 725/106 |
| 2005/0267809 A1 | 12/2005 | Zheng | |
| 2005/0267810 A1 | 12/2005 | Zheng | |
| 2005/0267820 A1 | 12/2005 | Zheng | |
| 2006/0010476 A1 | 1/2006 | Kelly | |
| 2006/0053049 A1 | 3/2006 | Nolan | |
| 2006/0075430 A1 | 4/2006 | Park | |
| 2006/0075432 A1* | 4/2006 | Abbadessa et al. | 725/46 |
| 2006/0087987 A1* | 4/2006 | Witt et al. | 370/260 |
| 2006/0101499 A1* | 5/2006 | Aravamudan et al. | 725/86 |
| 2006/0143653 A1* | 6/2006 | Suh | 725/46 |
| 2006/0161950 A1* | 7/2006 | Imai et al. | 725/46 |
| 2006/0190966 A1 | 8/2006 | McKissick et al. | |
| 2006/0200842 A1 | 9/2006 | Chapman | |
| 2007/0067805 A1 | 3/2007 | Macrae | |
| 2007/0094702 A1* | 4/2007 | Khare et al. | 725/134 |
| 2007/0107035 A1 | 5/2007 | Howe | |
| 2007/0124763 A1 | 5/2007 | Ellis | |
| 2007/0124795 A1* | 5/2007 | McKissick et al. | 725/135 |
| 2007/0136773 A1 | 6/2007 | O'Neil | |
| 2007/0155506 A1 | 7/2007 | Malik | |
| 2007/0157235 A1 | 7/2007 | Teunissen | |
| 2007/0168884 A1 | 7/2007 | Weeks | |
| 2007/0186269 A1 | 8/2007 | Malik | |
| 2007/0208766 A1 | 9/2007 | Malik | |
| 2008/0155616 A1* | 6/2008 | Logan et al. | 725/93 |
| 2008/0212941 A1* | 9/2008 | Lillethun et al. | 386/124 |
| 2009/0069038 A1* | 3/2009 | Olague et al. | 455/466 |

OTHER PUBLICATIONS

Ronald Schroeter. "Collaborative Video Indexing, Annotation and Discussion over High-Bandwidth Networks," Master's Thesis, School of ITEE, University of Queensland. Mar. 31, 2004. Accessed on Jul. 22, 2009 at http://www.itee.uq.edu.au/~eresearch/projects/vannotea/pub/MastersThesis_RonaldSchroeter.pdf.*
Zap2it.com: "TV Listings Frequently Asked Questions", http://web.archive.org/web/20000903002526/www.zap2it.com/index/1,1146,4_I_0_000,FF.html.
Cauley,Leslie "Microsoft, Baby Bell Form Video Alliance", The Wall Street Journal, Sep. 26, 1994.
Chorianopoulos,Konstantinos, "The Digital Set-Top Box as a Virtual Channel Provider", Dept. of Management Science and Technology, Athens University of Economics Apr. 2003.
Dransfeld,Henning et al, "Interactive TV and Formula One a Strategic Issue for Engine Suppliers", European Business Review, 1999.
Droitcourt,J.L., "Understanding How Interactive Television Set-Top Box Works . . . And What it will Mean to the Customer", International Broadcasting Convention, Sep. 14-18, 1995.
Elmer-Dewitt,Phillip, "Ready for Prime Time?", Time Archive, Dec. 26, 1994.
Elmer-Dewitt,Phillip, "Play . . . Fast Forward . . . Rewind . . . Pause U.S. Firms Want to Wire America for Two-Way TV, but their Systems Are Not Ready for Prime Time", Time Archive May 23, 1994.
Grant, Peter, "On-Demand TV Expands via Underused Fiber Highways", Wall Street Journal, Dec. 17, 2004.
Greenwald,John, "Battle for Remote Control", Time Archive, Mar. 1, 1995.
Hodge,Winston, "Architecture to Deliver Video on Demand", Electronic Business Buyer, Nov. 1994.
Jain, Sanjay K. et al, "Video on Demand: An Overview", A Central University, Feb. 2003.
Keough,Christopher, "Interactive TV Connection-Technology-Gold Pocket Interactive Acquires Mixed Signals Technologies", Los Angeles Business Journal, Mar. 4, 2002.
Leban,M. et al, "Internet Search for TV Content Based on TV Anytime", Sep. 22-24, 2003.
Lin, et al, "The Influence of Network Branding on Audience Affinity for Network Television", Advertising Research Foundation Feb. 2004.
Loizides, "Interactive TV: Dispelling Misconceptions in the Media", Acm Computers in Entertainment, vol. 3, No. 1, Article 7a, Jan. 2005.
Mermigas,Diane, "NBC Taking TV's Future by the Reins With On-Demand Content, Delivery", Television Week, Sep. 15, 2003.
Short,David, "A Quick Guide to Interactive Television", Broadcasting Engineering, Feb. 2005.
Srivastava,H.O., et al, "On-Line Broadcast Archives for Interactive Video", 1997.
Verhoeven,Jan L. et al, "System Architecture for Experimental Interactive Television", LogicaCMG Nederland B.V.
Waterman,David, "Internet TV: Business Models and Program Content", Dept. of Telecommunications Rradio and TV Center Sep. 2001.
"Building a Switched Broadcast network", Access Intelligence LLC Nov. 16, 2005.
"Building Dynamic Content for Set-Top Boxes", Sun Microsystems 1994-2005.
"Building the Perfect on Demand Beast: Television on Demand Presents a Dizzyling Array of Technology Options", Reed Business Information Nov. 3, 2003.
"Chips: Motorola's Scorpion Chip Turns TV Info Interactive Information Appliance", Work Group Computing Report Aug. 11, 1997.
"Columbia Tri-Star Television Distribution and Microsoft Sponsor Development Competition for Interactive Television", Microsoft Press Pass Jan. 25, 2000.
"EnReach Technology, Inc. Demonstrates Next Generation of Interactive Television with Innovative Open PVR Solution", EnReach Technology, Inc., PRNewswire.com, Sep. 1996-2006.
"Enter Video-on-Demand", Electronic News Aug. 31, 1998.
"Liberate Technologies Completes Assessment Aboard Scientific-Atlanta Explorer Set Tops and Digital Interactive Network", Liberate Technologies Press May 2, 2002.
"Next-Generation Digital Video Network; Intelligent IP Infrastructure Solutions for Cable Operators Offering VoD Services", Reed Business Information Feb. 2004.
"PBS Debuts Another First in Interactive Television; Wavexpress Selected to Provide Digital Broadcasting Platform", Market Wire Feb. 28, 2001.
"PENTV: BBC Achieves Significant Interactive TV Audiences with Open TV", Aug. 13, 2001.
"Set-Top Survival", Electronics Weekly May 22, 2002.
"Successfully Marketing Television on Demand: Operators, Programmers Look to Drive VOD Usage Through Promotions, Improved Navigation", Reed Business Information ISSN: 00072028, Nov. 22, 2004.
"Time Warner Introduces World's First Full Service Network in Orlando: Network offers First Digital Interactive Service Including Movies on Demand, Home Shopping and Interactive Games", Business Wire Dec. 14, 1994.
"Video on the Move", Reed Business Information Aug. 14, 2000.
"Worldgate Set to Deliver GO TV Links for Dynamic Interactive TV", Advanstar Communications, Inc., Oct. 22, 2002.
"http://www.nintendo.com/consumer/downloads/wave_english.pdf".
Berkowitz,Ben "Developers Interactinv With Sony Set-Top Box", Cable Worlds May 21, 2001.

Bissell, R.A. et al "The Set-Top Boxes for Interactive Services", BT Technology J., vol. 13, No. 4, Oct. 1995.

Carey, John "Contents and Service for the New Digital TV Environment".

Zollman, Peter M. "Interactive Television".

Knightrider TV Intro Theme, IMDb.com, Inc.

* cited by examiner

APPARATUSES AND METHODS FOR INTERACTIVE COMMUNICATION CONCERNING MULTIMEDIA CONTENT

BACKGROUND

The traditional model of television and video content presentation uses a single information stream that communicates video and often synchronized audio signals to a monitor that converts the received video and audio signals for presentation to a passive viewer. Under this model, the passive viewer has no control or interaction with the video content being received and observed.

Presently available analog and digital recorders provide some improvement in that viewers can record broadcast content for viewing at some later time. Generally, as described above with conventional video content presentation, a viewer with a recorder is still a passive viewer as the viewer has no control or interaction with the video content that has been recorded. A viewer with a recorder is limited to controlling the time and the flow of the recorded video information. That is, a viewer can enable control inputs associated with the recorder to play, pause, fast forward, skip or reverse. These controls essentially provide the passive viewer only one choice for a particular segment of recorded video information: the viewer can either see the underlying video content (albeit at a controllable rate and time), or skip one or more portions of the recorded video content.

With continuing development of data networks and methods for delivering live and pre-recorded video presentations to end users, and parallel development of computerized information systems, such as the Internet and the associated World Wide Web (WWW), there have been concerted efforts to integrate various systems to provide enhanced information delivery and entertainment systems. For example, developers are introducing integrated systems combining TVs with computer subsystems, so a TV may be used as a Web browser, or a personal computer may be used for enhanced TV viewing.

In some systems, computer elements, such as a microprocessor, memory, and the like, are built into the familiar chassis of a TV set. In such an integrated system, the TV screen becomes the display monitor when the system is operating in a computer mode. In such a system, conventional TV elements and circuitry are incorporated along with the computer elements, and capability is provided for a user to switch modes, or to view recorded or broadcast video with added computer interaction. One may thus, with a properly equipped system, select to view analog TV programs, digital TV programs, cable TV, satellite TV, and pay TV from multiple signal sources and various pages available via the WWW. These capabilities are often integrated into a single display, that is, one may view a broadcast presentation and also have a window on the display for Web interaction.

Despite the development of these integrated entertainment systems further improvements are desired, especially in the development of systems and methods that involve the user in an extension of the viewing and or listening experience. Thus, there is still a need for improved approaches for integrating the user in entertainment systems.

SUMMARY

Embodiments of an apparatus for use with an output device coupled to one or more sources of multimedia content. The apparatus includes an operator interface, a record generator and a network interface. The operator interface receives information responsive to a user's observation of a segment of multimedia content. The record generator creates a record that identifies the segment of multimedia content and includes information responsive to the user's observation of the segment of multimedia content. The network interface communicates presence information.

An embodiment of a method for generating a record for interactive and collaborative communication comprises the steps of receiving information that identifies a segment of multimedia content, receiving information from a user in response to the user's observation of the segment of multimedia content and generating a record comprising information that identifies the segment of multimedia content and information from the user.

An embodiment of a computer program product stored in a computer-readable medium includes computer program logic encoded thereon that, when executed in a physical device having an interface performs the operations of identifying a segment of multimedia content, generating a graphical-user interface that assists a user in providing information in response to the user's observation of the segment of multimedia content and generating a record responsive to both the segment of multimedia content and the user provided information.

Other apparatuses, methods, features and advantages will be or will become apparent to one with skill in the art upon examination of the following figures and detailed description. All such additional apparatuses, methods, features and advantages are defined and protected by the accompanying claims.

BRIEF DESCRIPTION OF THE FIGURES

The apparatuses and methods for interactive and collaborative communication concerning multimedia content can be better understood with reference to the following figures. The components within the figures are not necessarily to scale; emphasis instead is placed upon clearly illustrating the principles that support the apparatuses and methods. Moreover, in the figures, like reference numbers designate corresponding parts throughout the different views.

DETAILED DESCRIPTION

Figure 1:
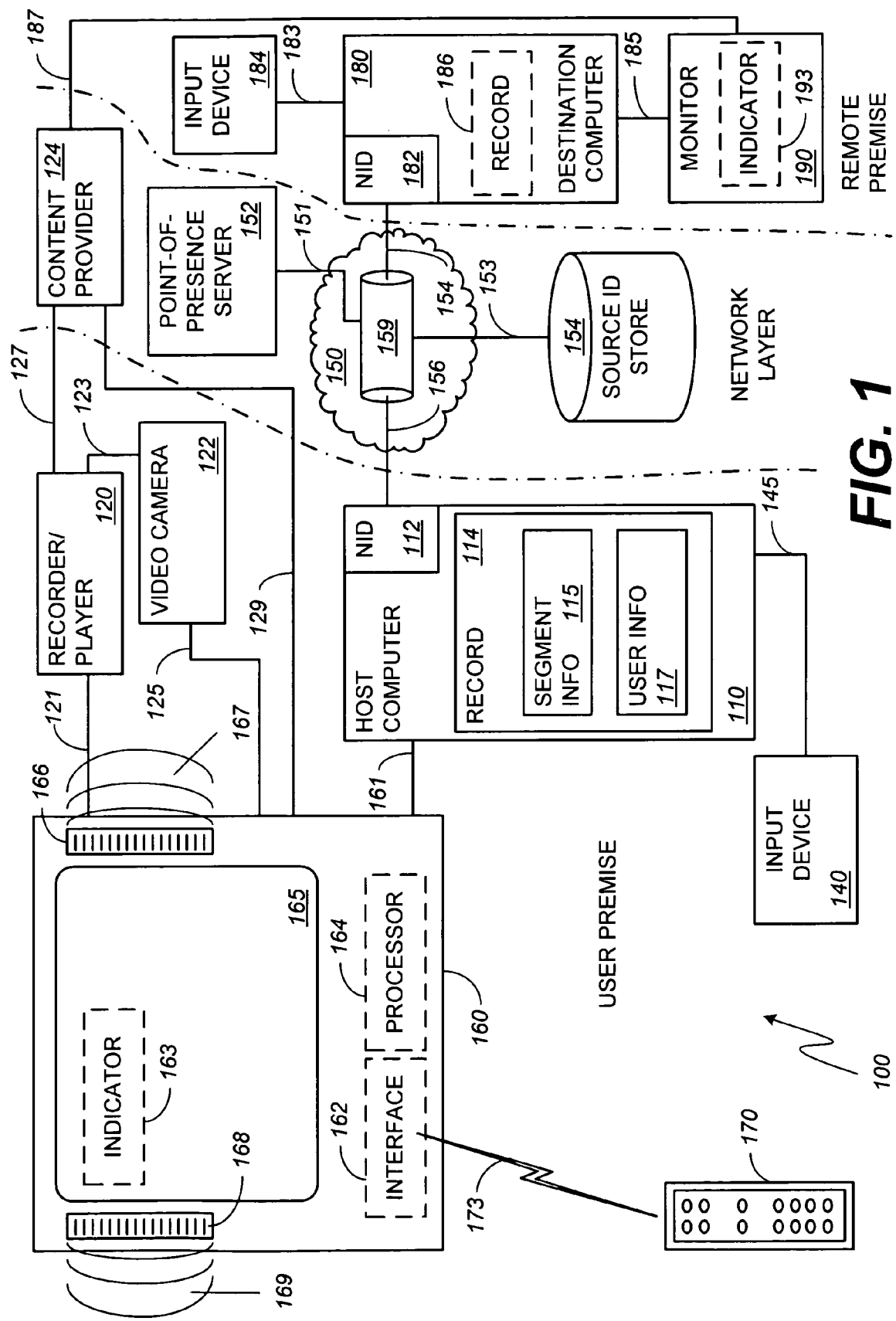
FIG. 1 is a block diagram illustrating an embodiment of a multimedia environment.

Interactive communication concerning multimedia content is provided by suitably configured devices coupled to output devices that present multimedia content to a local user. U.S. Pat. No. 5,818,438 (the '438 patent), the contents of which are incorporated by reference herein, discloses a system and method that provides an identifying code or interactive callback address along with information for directly invoking alternative multimedia content. A user of the system and method disclosed in the '438 patent can establish a session with a computing device using the interactive callback address and other information and upon completion of the session, re-tune or select the original content for viewing, listening or both.

According to an exemplary embodiment, a local input device permits a user to enter information concerning a segment of multimedia content presented to the user. The multimedia content may originate from both broadcast and non-broadcast sources. The user information or annotation is stored or temporarily buffered in a computing device in communication with the input device. A record or file includes both the user information and information that identifies the multimedia content upon which the user wishes to annotate or otherwise communicate an opinion.

In a first mode of operation, one or more records or files are generated and stored by a user. Upon completion of an annotation session, the one or more records or files may be stored for later transmission via portable data storage media or via a network transfer.

In a second mode of operation, the local input device further permits a user to generate or otherwise communicate a list of contacts that the user might want to receive the annotation. A point-of-presence server informs the user via a computing device when one or more listed contacts are online. An indicator, such as the indicator described in the '438 patent, may be communicated to contacts that are online. A contact interested in receiving the annotation may acknowledge the indicator after which the contact receives one or more records generated by the user in near real time. Because the records include the user information and information that identifies the multimedia content of interest, each of the records may be transferred, converted and presented to one or more contacts in close synchronization with live broadcast events. The interactive program manager associates this identifying code or interactive callback address with a location at which the presently viewed programming or application will be stored. The identifying code or interactive callback address may be a program-specific code that can be used to invoke one or more programs to configure a multimedia system.

A contact interested in observing or listening to the annotations and the associated media is able to controllably present the annotation information in multiple ways. For example, annotation information can be presented as a distinct window, separable from the original media; inserted in the original media; or can be mixed with the original media with controllable levels of mixing or dominance. Contact controlled mixtures of annotation information and associated media can present annotation information as a transparent overlay or watermark over the associated media on one extreme to a complete replacement of the video information on the other extreme. When annotation information contains both audio and visual information, a contact controlling the presentation of the associated media and the annotation information can mute both sources of audio information, mute the annotation only, mute the audio portion of the associated media, and play both the annotation and the audio from the associated media simultaneously.

A contact listening to audio annotation information is also capable of controllably adjusting the application of the audio annotation information. For example, environmental sounds may overcome or otherwise distract a contact that is listening to an annotation. Thus, preventing the contact from receiving and enjoying the annotation. When the annotation information is relatively short in duration, the contact may desire to replay or loop the annotation for a desired number of times, for a desired interval, or until another annotation is provided.

A contact observing visual annotation information is further capable of controllably adjusting the persistence of the annotation information being presented. For example, a contact that reads slowly may require a text based annotation to be presented for a much longer duration than other contacts. Once the time associated with a desired persistence interval has elapsed, the visual annotation information is removed. Removal can be accomplished in a single frame or the visual annotation information can be faded or otherwise transitioned to match the video information associated with a respective location on the display.

Having generally described the apparatuses and methods for interactive communication concerning multimedia content, various additional embodiments will be described with respect to FIGS. 1-6. By way of example, FIG. 1 is a block diagram illustrating an embodiment of a multimedia environment 100.

Multimedia environment 100 includes devices coupled to host computer 110 at a user premise, devices coupled to destination computer 180 located at a remote premise (i.e., a location remote from the user premise) and devices coupled to network 150 within a network layer that communicatively couples host computer 110 to destination computer 180. Host computer 110, recorder/player 120, video camera 122, input device 140, monitor 160 and wireless controller 170 are co-located at the user premise. Although shown as separate devices, one or more of these devices may be integrated within the same device. Monitor 160 is communicatively coupled to recorder/player 120 via link 121. Furthermore, monitor 160 is directly coupled to video camera 122 via link 125 and indirectly coupled to video camera 122 via link 123, recorder/player 120 and link 121. Moreover, monitor 160 is directly coupled to content provider 124 via link 129 and indirectly coupled to content provider 124 via link 127, recorder/player 120 and link 121. Monitor 160 receives multimedia content from recorder/player 120 via link 121, video camera 122 via link 125 and content provider 124 via link 129.

Multimedia content includes time varying audio information such as music from a music service, video information such as synchronized audio and video information provided in a broadcast television signal, a pay-per-view telecast, a movie, etc. Multimedia content communicated along link 121, link 125, and link 129 may comprise both analog and digital signals. Content provider 124 is further coupled to monitor 190 via link 187. In this way, content provider 124 forwards multimedia content into the user and remote premises. Content provider 124 may be a wired or wireless service such as a community antenna television enabled service, a satellite based service, a public-switched telephone network based service among other similar services that provide multimedia content to subscribers of the respective services.

Monitor 160 includes interface 162 for receiving command inputs from one or more local controls (not shown) integrated with monitor 160 or from wireless controller 170 via link 173. Monitor 160 further includes processor 164 for receiving multimedia content (e.g., analog and/or digital signals) and converting the same for presentation via display 165, right-side speaker 166, and left-side speaker 168. Processor 164 converts right-side audio information into a right-channel analog signal, which is converted into right-side audio 167 by right-side speaker 166. Processor 164 also converts left-side audio information into a left-channel analog signal, which is converted into left-side audio 169 by left-side speaker 168. In accordance with an in band or an out-of-band signal received along one of link 129 and link 161 monitor 160 presents indicator 163 on display 165. Indicator 163 provides notice to a user or other observer of multimedia content via monitor 160 that alternative content is available. Indicator 163 is presented when a remote contact desires to communicate with a user or other observer at the user premise.

Host computer 110 is a programmable machine. Host computer 110 responds to specific instructions in a well-defined manner. Furthermore, host computer 110 executes a set or sets of executable instructions (e.g., a program). As illustrated in FIG. 1, host computer 110 is coupled to network 150 via network interface device 112 (NID). NID 112 is a hardware device configured to convert signals provided by host computer 110 in accordance with one or more protocols to enable host computer 110 to communicate with data storage devices and other computing devices coupled to network 150. Host computer 110 is also coupled to monitor 160 via link 161. In some modes of operation, software resident on or otherwise provided to host computer 110 generates commands that direct processor 164 to display status information, user menus, graphical-user interfaces, as well as one or more indicators, representations, and other user information including user generated or provided video information.

Host computer 110 is further coupled to input device 140 via link 145. Input device 140 provides a mechanism for a user of host computer 110 to introduce user information 117. Input device 140 can be any device configured to receive audio, video, text, symbols and other information. Accordingly, input device 140 can be a microphone, a camera, a video camera, a keyboard and a human-to-machine interface associated with a personal digital assistant or other portable communication devices. Such human-to-machine interfaces may include touch sensitive displays or the combination of a graphical-user interface and a controllable pointing device such as a mouse. Whatever device or interface the user selects to generate or provide information to host computer 110, host computer 110 receives and if necessary converts the user information for storage. Specifically, host computer 110 integrates the user information 117 into record 114. Record 114 includes a combination of data objects or fields that contain both the user information 117 and information about a select portion of multimedia content or segment information 115.

The network layer couples devices at the user premise with devices at the remote premise. In this regard, content provider 124 provides multimedia content to devices at user premise and multimedia content to monitor 190 and perhaps additional device (not shown) at remote premise. In the illustrated embodiment, the network layer comprises content provider 124, network 150, point-of-presence server 152 and source identifier (ID) store 154 and connecting infrastructure (e.g., wired and/or wireless links).

Network 150 comprises a host of hardware devices configured to couple host computer 110 to point-of-presence server 152, source identifier (ID) store 154 and destination computer 180. Network 150 is coupled to host computer 110 via network link 156. Point-of-presence server 152 is communicatively coupled to network 150 via network link 151. Source ID store 154 is communicatively coupled to network 150 via network link 153. Destination computer 180 is coupled to network 150 via network link 158 and NID 182. Network 150 further includes communication channel 159 that identifies a communication path via network 150 through an identifying address associated with each of host computer 110 and destination computer 180, respectively, as well as port information for respective software (i.e., presence clients) operative on each of the computing devices.

Point-of-presence server 152 includes personalized lists of contacts that a particular user expects to be connected and available to receive previously generated and recorded annotations and/or near real time annotations regarding an identified segment of multimedia content. When a user is online and has initiated an appropriately configured software program (e.g., a client) operative on host computer 110, point-of-presence server 152 accesses the user's contact list and checks to see if any of the people listed in the contact list are presently online. When point-of-presence server 152 identifies that an online user's contact is online, point-of-presence server 152 forwards the user's connection information to the contact via a similarly configured software program operative on a computing device such as destination computer 180. Once the respective connection information is shared, host computer 110 can communicate with or without assistance from point-of-presence server 152.

Point-of-presence server 152 may be further provided additional information regarding one or more contacts. For example, a contact with a portable or fixed media device may be contacted with an alert message that indicates that they are being invited to accept annotation information in near real time. The alert message may be communicated via an e-mail message, a short message service (SMS or cellular phone text messaging), or a multimedia messaging service (MMS). A contact using the media device will have the option of immediately viewing the media with annotations or requesting that the viewing begin where the annotation starts. Retracing the viewing to the beginning of the annotation session may require that the media be retransmitted as well, if a local copy is not available for replaying.

Source ID store 154 is configured to hold information regarding multimedia content available to a user and one or more contacts such as an operator of destination computer 180. The information is used to identify both multimedia content of interest and one or more locations where the multimedia content can be accessed. In the illustrated embodiment and as described above, record 114 does not include a stored representation of the multimedia content of interest. Record 114 includes information that identifies the multimedia content or defines a segment or portion of the content. A definition of the multimedia content of interest may include one or more locations and content providers that may grant access to the content. Each of the host computer 110 and the destination computer 180 or devices proximally located with each of these respective devices are configured to access the multimedia content of interest in accordance with information provided or otherwise available via source ID store 154. In this way, each of record 114 and record 184 may be relatively small and easily communicated in near real time as a user and a remotely located contact are observing regularly scheduled programming or some other broadcast event.

Destination computer 180, input device 184 and monitor 190 are co-located at the remote premise. Destination computer 180 is a programmable machine. Destination computer 180 responds to specific instructions in a well-defined manner. Furthermore, destination computer 180 executes a set or sets of executable instructions (e.g., a program). As illustrated in FIG. 1, destination computer 180 is coupled to network 150 via NID 182. NID 182 is a hardware device configured to convert signals provided by destination computer 180 in accordance with one or more protocols to enable an operator of destination computer 180 to communicate with data storage devices and other computing devices coupled to network 150. Destination computer 180 is also coupled to monitor 190 via link 185. In some modes of operation, software resident on or otherwise provided to destination computer 180 generates commands that direct monitor 190 or other output devices (not shown) to display status information, user menus, graphical-user interfaces, as well as one or more indicators, representations, and other information including information generated or provided concerning a segment of multimedia content identified and annotated by a user of host computer 110.

Monitor 190 includes an interface (not shown) for receiving command inputs from one or more local controls (also not shown). In addition, monitor 190 may be configured much like monitor 160 with a dedicated processor and one or more speakers. In accordance with an in band or an out-of-band signal received along one of link 185 and link 187, monitor 190 presents indicator 193. Indicator 193 provides notice to a contact or other observer of multimedia content via monitor 190 that alternative content is available. Indicator 193 is presented when a user desires to communicate with a contact or other observer at the remote premise.

Destination computer 180 is further coupled to input device 184 via link 183. Input device 184 provides a mechanism for a user of destination computer 180 to introduce information in response to user information 117 and/or segment information 115. Input device 184 can be any device configured to receive audio, video, text, symbols and other information. Accordingly, input device 184 can be a microphone, a camera, a video camera, a keyboard and a human-to-machine interface associated with a personal digital assistant or other portable communication devices. Such human-to-machine interfaces may include touch sensitive displays or the combination of a graphical-user interface and a controllable pointing device such as a mouse. Whatever device or interface the operator selects to generate or provide information to destination computer 180, destination computer 180 receives and if necessary converts the information for storage and integration into record 184.

Host computer 110, destination computer 180 and content provider 124 may each be configured to insert an identifying code or interactive callback address either in a program signal (an in-band signal) or in an out-of-band signal. Host computer 110, destination computer 180 and content provider 124 may also configured to store the identity of the source or channel on which the presently viewed programming is being received in one or more storage devices. These devices may each be configured to detect and store information accompanying the transmission of the identifying code or interactive callback address regarding an image to be displayed on the display device (such as a "key," "icon," or "indicator") or an audio message to be reproduced to indicate the availability of alternative content that might be of interest to a user. Each device may also be coupled to a processor configured to generate a video image based on the received or pre-stored "key," "icon," or "indicator" information, or alternatively, is programmed to generate the video signal and is coupled to the display device in such a manner as to provide such a signal to that device.

Furthermore, host computer 110, destination computer 180 and content provider 124 may be adapted to communicate with a user/receiver via a menu presented on the display of a respective monitor upon receipt of a command input from the user/receiver in response to observing the indicator (i.e., seeing the "icon" or hearing the message). The menu includes one or more inputs for controllably configuring the multimedia system. Host computer 110, destination computer 180 and content provider 124 may first store the identity of the channel or device on which the content then being viewed is being transmitted.

As described above and in the '438 patent, one or more indicators, such as indicator 163 and indicator 193 are integrated within the various signals communicated via link 161 and link 185 to indicate to a user/receiver that alternative content is available. In the illustrated embodiment, indicator 163 and indicator 193 are visual and presented on respective output devices. In an alternative mode of operation, an audio indicator may be communicated in the form of an audible tone or a message communicated via speaker 166 and speaker 168, or both the audio indicator and the visual indicator may be enabled.

In the illustrated embodiment, host computer 110 and destination computer 180 are separate devices. It should be understood that the functions provided by the respective computers could be integrated or otherwise combined with monitor 160, monitor 190 or some other device such as a set top box or some other device communicatively coupled to the respective monitor. It should also be understood that the functions provided by point-of-presence server 152, content provider 124 and source ID store 154 could be combined or integrated in various combinations to provide the described apparatuses and methods for interactive communication concerning multimedia content.

Figure 2:
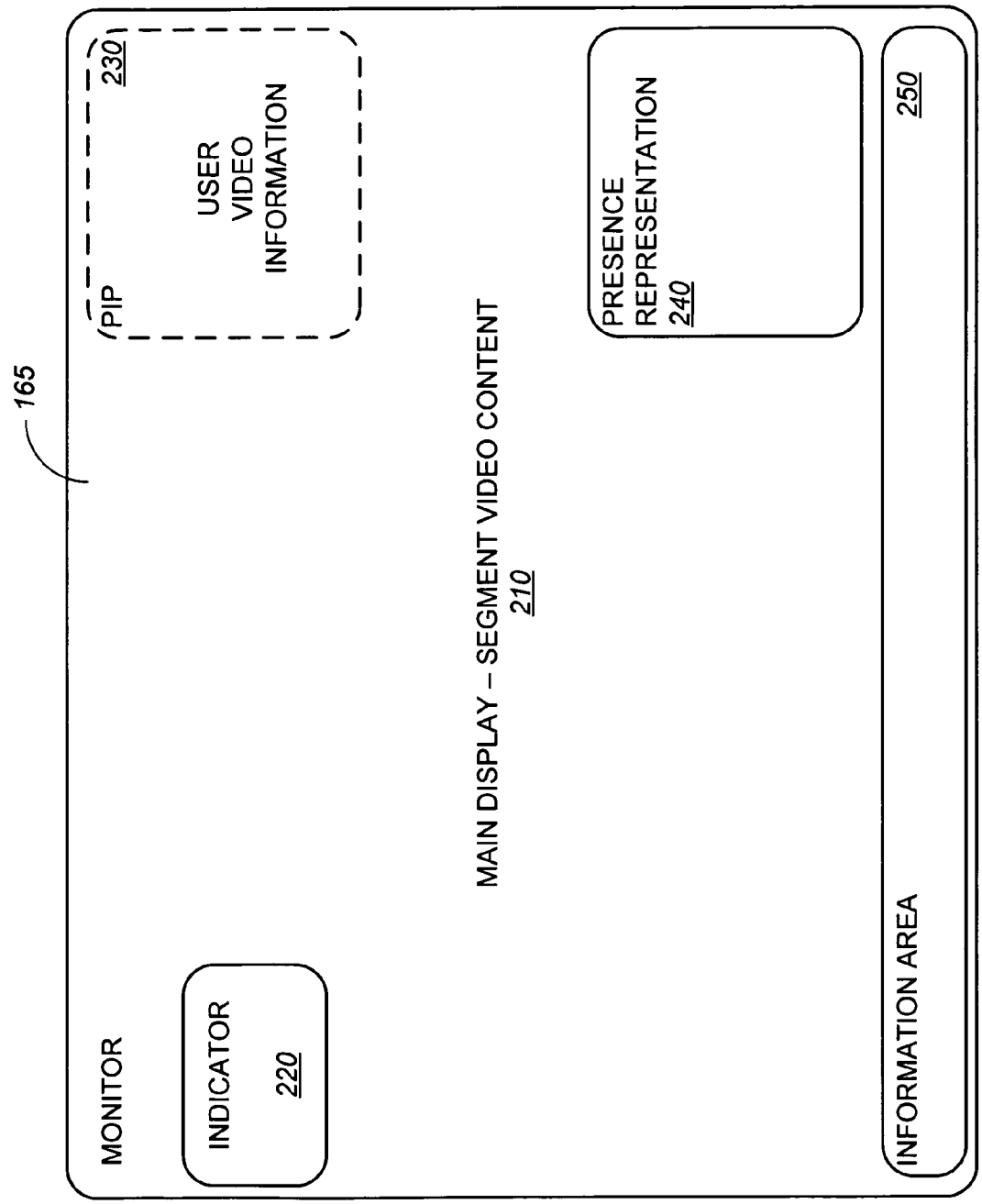
FIG. 2 is a schematic diagram illustrating an embodiment of the monitor of FIG. 1.

FIG. 2 is a schematic diagram illustrating an embodiment of the display 165 of monitor 160 introduced in FIG. 1. The embodiment illustrated in FIG. 2 presents an operating mode of monitor 160 where main display 210 includes a presentation of the video content from an identified segment comprising video content. Associated audio content may be reproduced by speakers associated with monitor 160. A host of additional items are presented in select areas of the foreground of display 165. Indicator 220 (in its visual form) is presented in an indicator window in the upper-left portion of display 165. User generated video information is presented in picture-in-picture window 230. Presence representation 240 appears in the lower-right portion of display 165.

As explained above, point-of-presence server 152 generates and maintains a file or record that includes network connection information for the identified user and one or more lists of users in the user's contact list. Presence representation 240 includes information regarding the current status of contacts associated with an identified user. Periodically, point-of-presence server 152 receives updated information. When one of the user's contacts is newly connected to the network, client software resident in host computer 110 receives a message from point-of-presence server 152 with connection information for that particular contact. The point-of-presence server 152 also forwards the user's status and connection information to the contacts that are presently coupled to the network.

Information area 250 is presented along the lower-edge portion of display 165. Information area 250 includes text and one or more icons representing the present operating status and user information being generated for communication with one or more destination devices. As explained above, in a first operating mode, annotations entered by a user of an identified segment are stored in one or more of a local storage device and a locally generated storage medium or buffered on a network-coupled storage device at a location remote from a user premise. Upon receipt of a user command, the annotations and/or the annotations and the segment of multimedia content that is the subject of the annotation or user information is transmitted or transferred to a storage medium. In a second operating mode, annotations entered by a user are communicated in near real time to one or more designated destination devices associated with identified contacts.

Whether the host computer 110 is operating in the described first or second modes of operation, information area 250 is available to receive other information that is also presented to the user. When operating in the first mode of operation, the additional information may comprise closed-captioning information or other information derived from or otherwise associated with the segment of multimedia content. When the host computer 110 is operating in the second mode of operation, information area 250 can include a running list of annotations along with an indication of the party that communicated the annotation.

The example operating mode illustrated in FIG. 2 is just one of many possible arrangements that can be generated via the host computer 110 and monitor 160. For example, alternative embodiments may include changing the location of one or more of the windows. In addition, one or more items may be integrated or otherwise arranged to share a select area of display 165.

Figure 3:
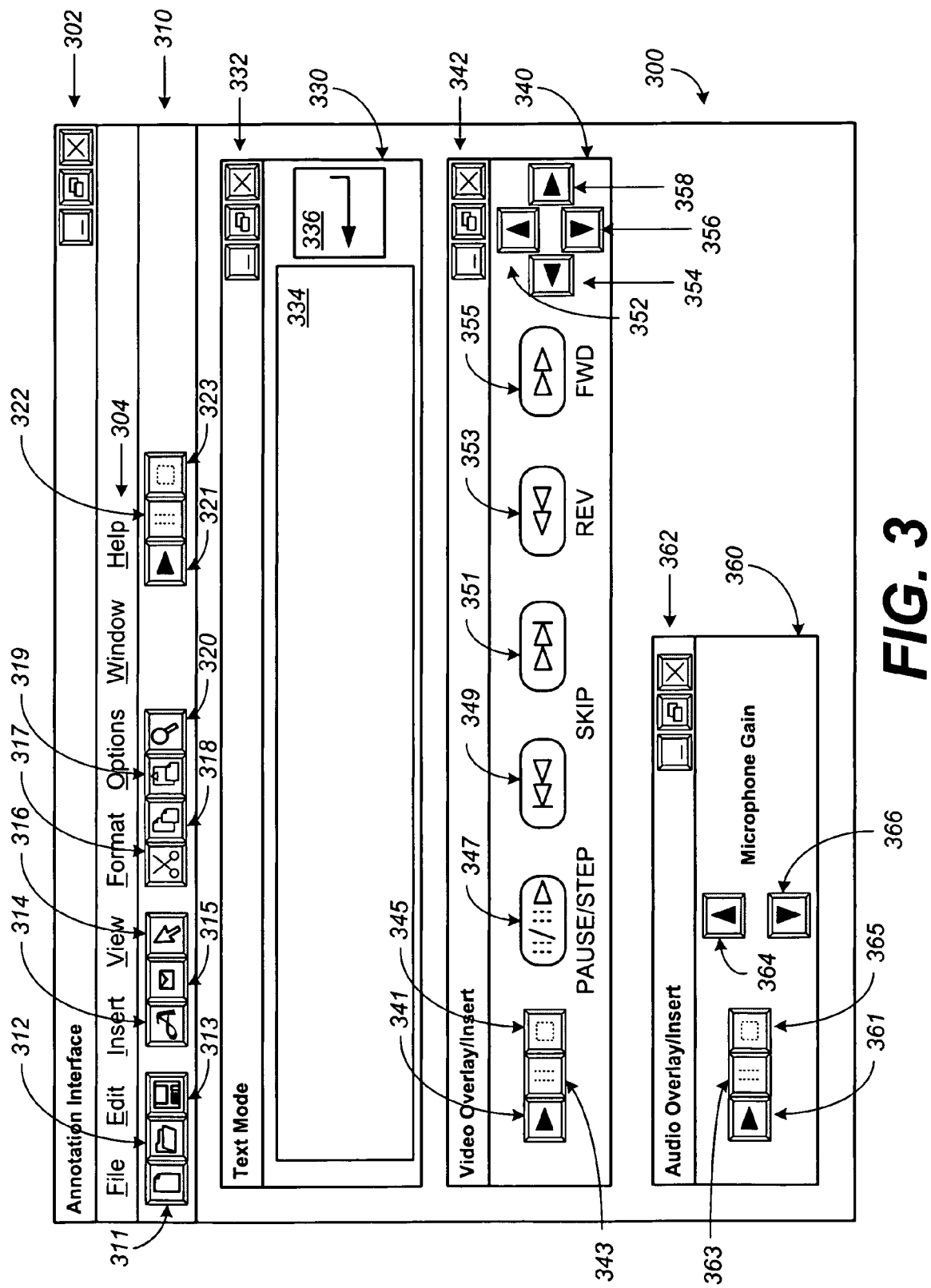
FIG. 3 is a schematic diagram illustrating an embodiment of an annotation mode configuration interface presented on the monitor of FIG. 1.

FIG. 3 is a schematic diagram illustrating an embodiment of an annotation mode configuration interface 300 presented on the monitor 160 or another suitably configured display device communicatively coupled to the host computer 110 of FIG. 1. In the illustrated embodiment, configuration interface 300 is a graphical-user interface (GUI) arranged to enable a user to quickly switch between annotation modes and generate annotation entries at identified times and/or locations within an identified segment of multimedia content. As indicated in FIG. 3, configuration interface 300 comprises a title bar 302, pull-down menu bar 304, tool bar 310 as well as text-mode interface 330, video overlay/insert interface 440 and audio overlay/insert interface 460. Title bar 302, labeled "Annotation Interface" includes pushbuttons configured to minimize, maximize and close the annotation interface 300. Pull-down menu bar 304 includes a host of titled menus that when selected by the user, open a respective list of related options. For example, the menu labeled "File" includes file-level operations such as open, save close, print, etc. Pull-down menu bar 304 further includes menus labeled "Edit," "Insert," "View," "Format," "Options," "Window," and "Help" with each respective menu having a set of related options or functions. Tool bar 310 includes a host of functional pushbuttons. Each respective pushbutton, such as pushbutton 311 is labeled with an icon indicative of the underlying function or operation performed by the annotation interface 300 upon operator selection of the respective pushbutton. For example, pushbutton 311 directs the annotation interface 300 to open a new document or file. Pushbutton 312 directs the interface to open a file from a previously recorded location in a data store coupled to the host computer 110. When selected, pushbutton 313 saves the present interface contents to a file. Pushbutton 314 directs the annotation interface 300 to enter a text-entry mode. When selected, pushbutton 315 opens an email application on host computer 110. Pushbutton 316 enables a user to use a positional interface associated with host computer 110 to direct a pointer to items within annotation interface 300. When selected, pushbutton 317 directs the annotation interface 300 to delete highlighted information from the interface. Pushbutton 318 directs the annotation interface 300 to copy highlighted information (i.e., place the highlighted information into a temporary buffer. When selected, pushbutton 319 directs the annotation interface 300 to insert the information stored in the temporary buffer at a specified location within the annotation interface 300. Pushbutton 320 opens a search-utility interface. In addition, tool bar 310 includes pushbutton controls that forward commands and/or controls to one or more sources of multimedia content to enable an operator of the annotation interface 300 to locate or otherwise identify a specific location in a present segment where an annotation is desired. Pushbutton 321 directs the device providing the segment information (i.e., the multimedia information) to advance through the segment. When selected, pushbutton 322 directs the external device providing the segment information to pause. Pushbutton 323 directs the external device to stop advancing the segment information.

As further illustrated in FIG. 3, annotation interface 300 comprises text-mode interface window 330. Text-mode interface window 300 includes title bar 332, text-entry panel 334 and enter pushbutton 336. Title bar 332, labeled "Text Mode" includes pushbuttons configured to minimize, maximize and close text-mode interface 330. In operation, a user who desires to annotate a specified location of a segment with textual information enters the text using text-entry panel 334 and one or more human-machine control interfaces to convey the message. When selected once, enter pushbutton 336 directs text-mode interface 330 to function as a return key and close a present string of textual information present in text-entry panel 334. When selected twice within a set period of time, enter pushbutton 336 directs the text-mode interface 330 to save and forward the presently entered text string in text-entry panel 334 to a record or file when the user is operating in the store-forward mode. Otherwise, when the user is communicating with one or more contacts in near real time enter pushbutton 336 directs annotation interface 300 to communicate the buffered text in text-entry panel 334 to the one or more contacts.

Annotation interface 300 also comprises a video-overlay interface window 340. Video-overlay interface window 340 includes title bar 342, labeled "Video Overlay/Insert," which includes pushbuttons configured to minimize, maximize and close video-overlay interface 440. Pushbutton 341 directs the device providing the segment information (i.e., the multimedia content or audio only and video only information) to advance through the segment. When selected, pushbutton 343 directs the external device providing the segment information to pause. Pushbutton 345 directs the external device to stop advancing the segment information. Upon a first selection, pushbutton 347 directs the external device providing the segment information to pause. A second selection of pushbutton 347 directs the external device to advance the segment information by a predetermined length of run time. When selected, pushbutton 349 directs the external device to skip a predetermined length of run time in reverse. Pushbutton 351 directs the external device to skip forward a predetermined length of run time. Pushbutton 353 directs the external device to reverse the segment information. Pushbutton 355 directs the external device to forward the segment information. Positional control 352 moves a pointer in a step-wise and upward direction across the range of display 165. Positional control 356 moves a pointer in a step-wise and downward direction across the range of display 165. Positional control 354 moves a pointer in a step-wise and leftward direction across the range of display 165. Positional control 358 moves a pointer in a step-wise and rightward direction across the range of display 165. In operation, a user who desires to annotate a segment with textual or video information or a pointer or some other symbol uses a combination of pushbutton 316 and one or more of positional control 352, positional control 354, positional control 356 and positional control 358 to controllably position the annotation.

Annotation interface 300 further comprises an audio-overlay interface window 360. Audio-overlay interface window 360 includes title bar 362, labeled "Audio Overlay/Insert," which further includes pushbuttons configured to minimize, maximize and close video-overlay interface 460. Pushbutton 361 directs the device providing the segment information (i.e., the multimedia information, the audio only or video only information) to advance through the segment. When selected, pushbutton 363 directs the external device providing the segment information to pause. Pushbutton 365 directs the external device to stop advancing the segment information. When selected, pushbutton 364 increases an amplification factor or gain applied to audio information that is being included in a record or file by an operator of annotation interface 300. Pushbutton 366, on the other hand, decreases an amplification factor or gain applied to audio information that is being included in a record or file.

Figure 4:
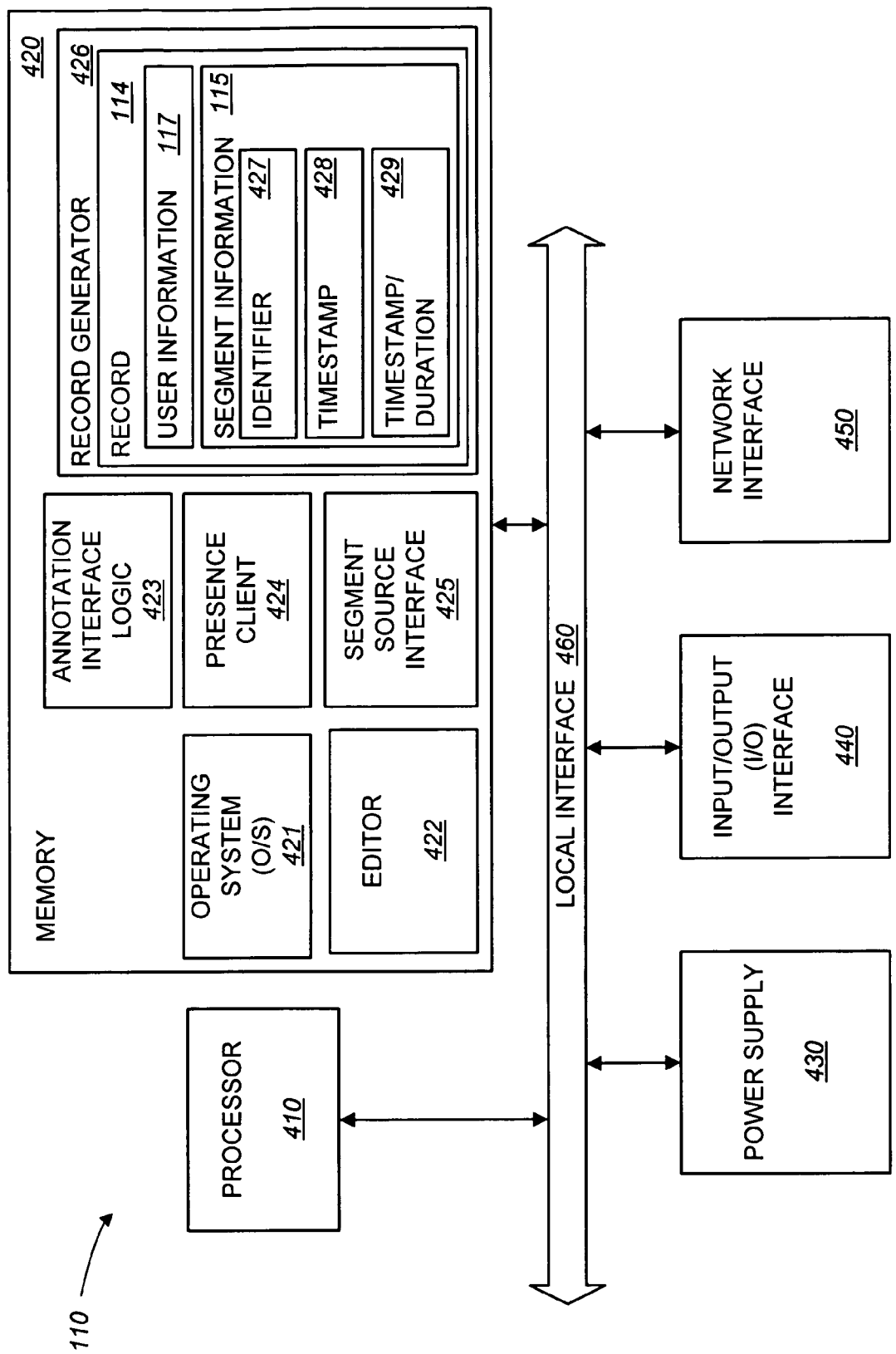
FIG. 4 is a schematic diagram illustrating an embodiment of the host computing device of FIG. 1.

FIG. 4 is a schematic diagram illustrating an embodiment of the host computer 110 of FIG. 1. Generally, in terms of hardware architecture, host computer 110 includes processor 410, memory 420, power supply 430, input/output (I/O) interface 440 and network interface 450. Processor 410, memory 420, power supply 430, I/O interface 440 and network interface 450 are communicatively coupled via local interface 460. Local interface 460 can be, for example but not limited to, one or more buses or other wired or wireless connections, as is known in the art. Local interface 460 may have additional elements, which are omitted for simplicity, such as controllers, buffers (caches), drivers, repeaters, and receivers, to enable communications. Further, local interface 460 may include address, control, and/or data connections to enable appropriate communications among the aforementioned components.

Power supply 430 provides power to each of the processor 410, memory 420, I/O interface 440, network interface 450 and local interface 460 in a manner understood by one of ordinary skill in the art.

Processor 410 is a hardware device for executing software, particularly that stored in memory 420. The processor 410 can be any custom made or commercially available processor, a central processing unit (CPU), an auxiliary processor among several processors associated with the host computer 110, a semiconductor based microprocessor (in the form of a microchip or chip set), or generally any device for executing software instructions.

The memory 420 can include any one or combination of volatile memory elements (e.g., random-access memory (RAM, such as dynamic random-access memory (DRAM), static random-access memory (SRAM), synchronous dynamic random-access memory (SDRAM), etc.) and non-volatile memory elements (e.g., read-only memory (ROM), hard drive, tape, compact disc read-only memory (CDROM), etc.). Moreover, the memory 420 may incorporate electronic, magnetic, optical, and/or other types of storage media. Note that the memory 420 can have a distributed architecture, where various components are situated remote from one another, but accessible by the processor 410.

The software in memory 420 may include one or more separate programs, each of which comprises an ordered listing of executable instructions for implementing logical functions in addition to identified locations for data storage. In the example embodiment, the software in the memory 420 includes operating system 421, editor 422, annotation interface logic 423, presence client 424, segment source interface 425 and record generator 426. The operating system 421 essentially controls the execution of other programs, such as editor 422, annotation interface logic 423, presence client 424, segment source interface 425 and record generator 426 and provides scheduling, input-output control, file and data management, memory management, and communication control and related services.

Editor 422 includes logic configured to add, delete or change information entered by a user of the multimedia system 100. Editor 422 enables an observer of a select segment of multimedia content to annotate the segment. For example, editor 422 includes logic that enables an observer of the select segment of multimedia content to enter text, one or more non-text symbols such as pointers, audio and video information. Note that an observer of the segment may elect to use any of the information types or may elect to use any combination of the information types. It is also important to note that editor 422 is unlike other video editors in that editor 422 does not interact with the audio and video information within the select segment. Rather, editor 422 works together with record generator 426 to generate an ancillary record or file that may be observed in synchronization with the select segment of multimedia content to communicate information from a user of multimedia system 100 to another observer or receiver of the multimedia segment.

Annotation interface logic 423 includes logic configured to generate the graphical-user interface of FIG. 3. That is, annotation interface logic 423 includes logic configured to generate windows, labels, functional pushbuttons, drop-down menus and the like. For example, annotation interface logic 423 includes logic configured to generate annotation interface 300 including text-mode interface 330, video overlay/insert interface 340 and audio overlay/insert 360. As described above, annotation interface logic 423 includes logic configured to enable an operator of host computer 110 to insert one or more of text or other symbols, audio or video information while observing a select segment of multimedia content. As also described above, an operator may elect to use each of the various annotation information types alone or in any combination when generating a record or file.

Segment source interface 425 includes logic configured to generate the various commands that enable a user to direct one or more devices to manipulate multimedia content. Segment source interface 425 includes logic configured to play, pause or stop a real time representation of a previously recorded or buffered segment of multimedia content. Segment source interface 425 further includes logic configured to step forward, skip ahead, skip back, move forward in time, or move backward in time over a segment of multimedia content.

Presence client 424 includes logic configured to communicate with a wide area network coupled server such as point-of-presence server 152 (FIG. 1). Presence client 424 may use a proprietary communication protocol to communicate with point-of-presence server 152. Once presence client 424 is connected to the point-of-presence server 152, host computer 110, under the direction of logic within presence client 424, opens an interface that enables a user of the host computer 110 to enter a username and perhaps additional information to login to the point-of-presence server 152. Once the user is logged in, presence client 424 sends the point-of-presence server 152 connection information associated with the host computer 110 and the presence client 424 (e.g., an Internet protocol (IP) address and an identifier of the port assigned to the presence client 424 by host computer 110). In turn, the point-of-presence server 152 creates a temporary file that holds the connection information and a list of potential receivers or contacts that may or may not be coupled to the wide area network. If the point-of-presence server 152 finds any of the potential receivers logged in, the point-of-presence server 152 sends connection information to presence client 424 for each of the logged in contacts. When presence client 424 receives the connection information associated with one or more potential receivers or contacts, presence client 424 updates the status of each of the reporting contacts to "online." Thereafter, a user of host computer 110 and presence client 424 can establish a direct communication channel (i.e., the server is bypassed) between the host computer 110 and a communication device being used by one of the user's contacts.

Record generator 426 includes logic configured to enable a user of host computer 110 to create and when used together with editor 422 manipulate information generated in response to a user's observation of a select segment of multimedia content. As indicated in the sample embodiment illustrated in FIG. 4, record generator 426 is configured to generate and temporarily buffer record 114. Record 114 includes segment information 115 and user information 117. Segment information 115 includes identifier 427, timestamp 428, and timestamp/duration 429. User information 117 includes one or more of a name, username, computing device identifier, etc. Identifier 427 includes information that identifies or describes the multimedia content. Timestamp 428 includes information that identifies or describes a first location within the multimedia content of interest. Timestamp/duration 429 includes information that identifies or describes a second location within the multimedia content of interest relative to the first location.

Editor 422, annotation interface logic 423, presence client 424, segment source interface 425 and record generator 426 are source programs, executable programs (object code), scripts, or any other entities comprising a set of instructions to be performed. When implemented as source programs, the programs are translated via a compiler, assembler, interpreter, or the like, which may or may not be included within the memory 420, so as to operate properly in connection with the O/S 421. Furthermore, editor 422, annotation interface logic 423, presence client 424, segment source interface 425 and record generator 426 can be written in one or more object-oriented programming languages, which have classes of data and methods, or procedure programming languages, which have routines, subroutines, and/or functions.

I/O interface 440 is a hardware device for communicatively coupling local input devices, for example but not limited to, a keyboard, mouse, scanner, microphone, etc. Furthermore, I/O interface 440 communicatively couples local output devices, for example but not limited to, a printer, display, etc. These local I/O devices may be provided to configure and maintain host computer 110 as desired. Moreover, these local I/O devices may be provided to assist a user or observer of a segment of multimedia content in generating information about the segment. As described above, the information about the segment may include text, other symbols, audio and video information or combinations of any or all of the separate information types.

Network interface 450 is a hardware device for communicatively coupling network-coupled devices to host computer 110 via various wired and wireless networks. In this regard, network interface 450 may include devices that communicate both inputs and outputs, for instance but not limited to, a modulator/demodulator (modem; for accessing another device, system, or network), a radio frequency (RF) or other transceiver, a telephonic interface, a bridge, a router, etc.

Network interface 450 exposes host computer 110 to wired and wireless data networks, including but not limited to, community access television (CATV) distribution networks, satellite broadcast networks, public-switched telephone network (PSTN) based communication services, DSL, and cellular data networks. Accordingly, network interface 450 is configured to perform the signal conditioning and format conversions to communicate data through communication channel 159 (FIG. 1). Under some circumstances, signal conditioning and format conversions include the performance of a variety of functions including, for example encoding and encapsulating data in packets under one or more protocols including transmission control protocol/Internet protocol (TCP/IP), among others.

When host computer 110 is in operation, the processor 410 is configured to execute software stored within the memory 420, to communicate data to and from the memory 420, and to generally control operations of the host computer 110 pursuant to the software and data elements. Editor 422, annotation interface logic 423, presence client 424, segment source interface 425, record generator 426 and O/S 421, in whole or in part, but typically the latter, are read by the processor 410, perhaps buffered within the processor 410, and then executed.

When editor 422, annotation interface logic 423, presence client 424, segment source interface 425 and record generator 426 are implemented in software, as is shown in FIG. 4, it should be noted that these software elements can be stored on any computer-readable medium for use by or in connection with any computer related system or method. In an alternative embodiment, where one or more of the editor 422, annotation interface logic 423, presence client 424, segment source interface 425 and record generator 426 are implemented in hardware, the editor 422, annotation interface logic 423, presence client 424, segment source interface 425 and record generator 426 can implemented with any or a combination of the following technologies, which are each well known in the art: a discrete logic circuit(s) having logic gates for implementing logic functions upon data signals, an application-specific integrated circuit (ASIC) having appropriate combinational logic gates, a programmable gate array(s) (PGA), a field-programmable gate array (FPGA), etc.

In the context of this document, a "computer-readable medium" can be any means that can contain, store, communicate, propagate, or transport the program for use by or in connection with the instruction execution system, apparatus, or device. The computer-readable medium can be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection (electronic) having one or more wires, a portable computer diskette (magnetic), a RAM, a ROM, an erasable programmable read-only memory (EPROM or Flash memory) (magnetic), an optical fiber (optical), and a portable CDROM (optical). Note that the computer-readable medium could even be paper or another suitable medium upon which the program is printed and the program can be electronically captured, via for instance, optical scanning of the paper or other medium, then compiled, interpreted or otherwise processed in a suitable manner if necessary, and then stored in a computer memory.

Figure 5:
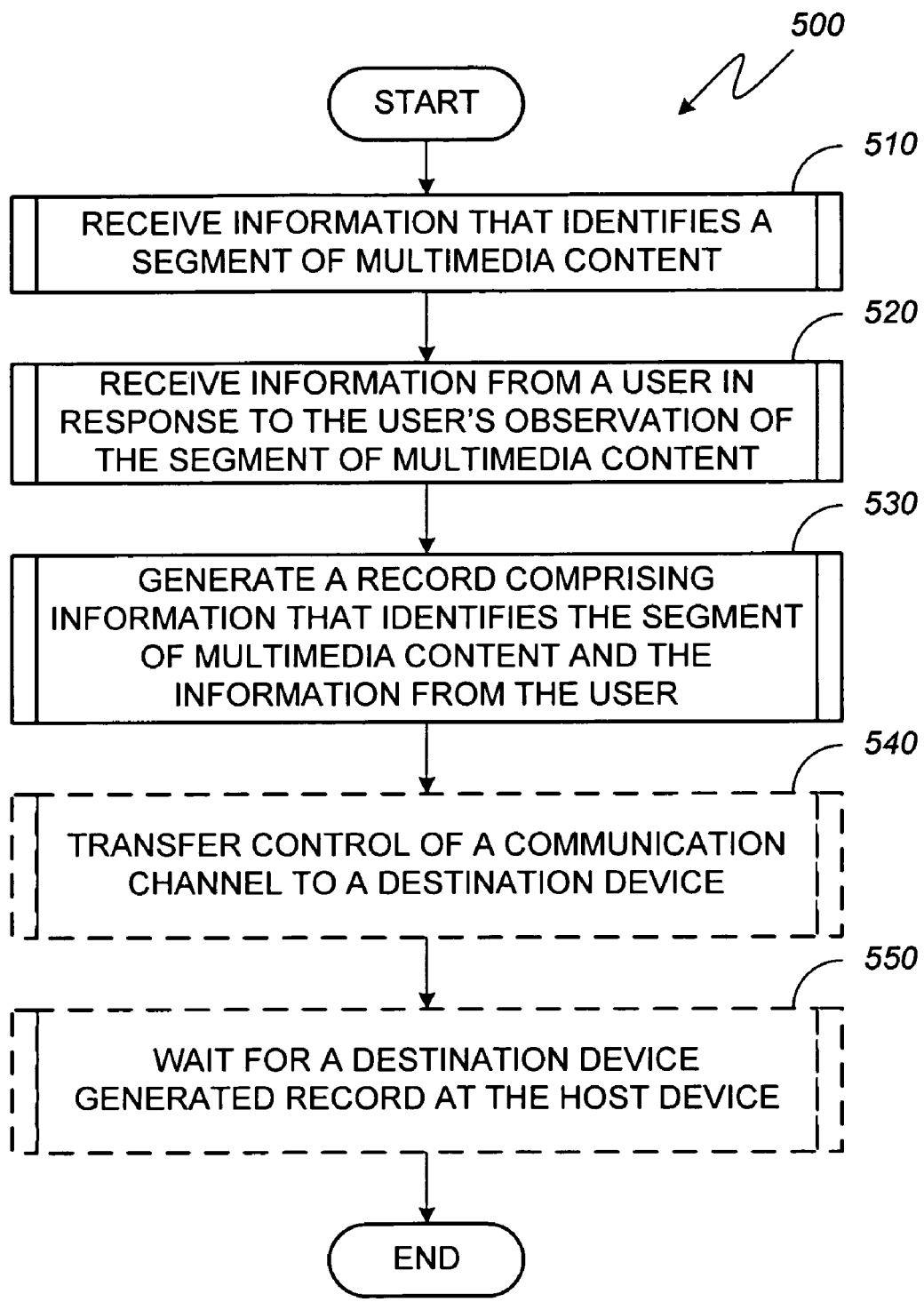
FIG. 5 is a flow diagram illustrating an embodiment of a method for generating a record for interactive and collaborative communication.

FIG. 5 is a flow diagram illustrating an embodiment of a method 500 for generating a record for interactive and collaborative communication. In this regard, each block represents a specified step or function. When embodied in software and/or hardware/firmware, each block represents a module, segment, or portion of code, which comprises one or more executable instructions for implementing the specified function(s). Method 500 begins with block 510 where an apparatus such as host computer 110 receives information that identifies a segment of multimedia content. In block 520, host computer 110 receives information from a user in response to the user's observation of the segment of multimedia content. Thereafter, in block 530, host computer 110 generates a record comprising information that identifies the segment of multimedia content and the information from the user.

When a user of host computer 110 is observing multimedia content and providing information to a record "offline," the operations illustrated in optional block 540 and optional block 550 are omitted. Otherwise, when a user of host computer 110 is observing multimedia content and providing information to a record with the desire to communicate the record in near real time to one or more potential receivers or contacts, the operations illustrated in optional block 540 and optional block 550 may be implemented by host computer 110. In optional block 540, host computer 110 transfers control of a communication channel to a destination device. While the communication channel is under the control of the destination device, host computer 110 waits for a destination device generated record, as indicated in optional block 550.

Figure 6:
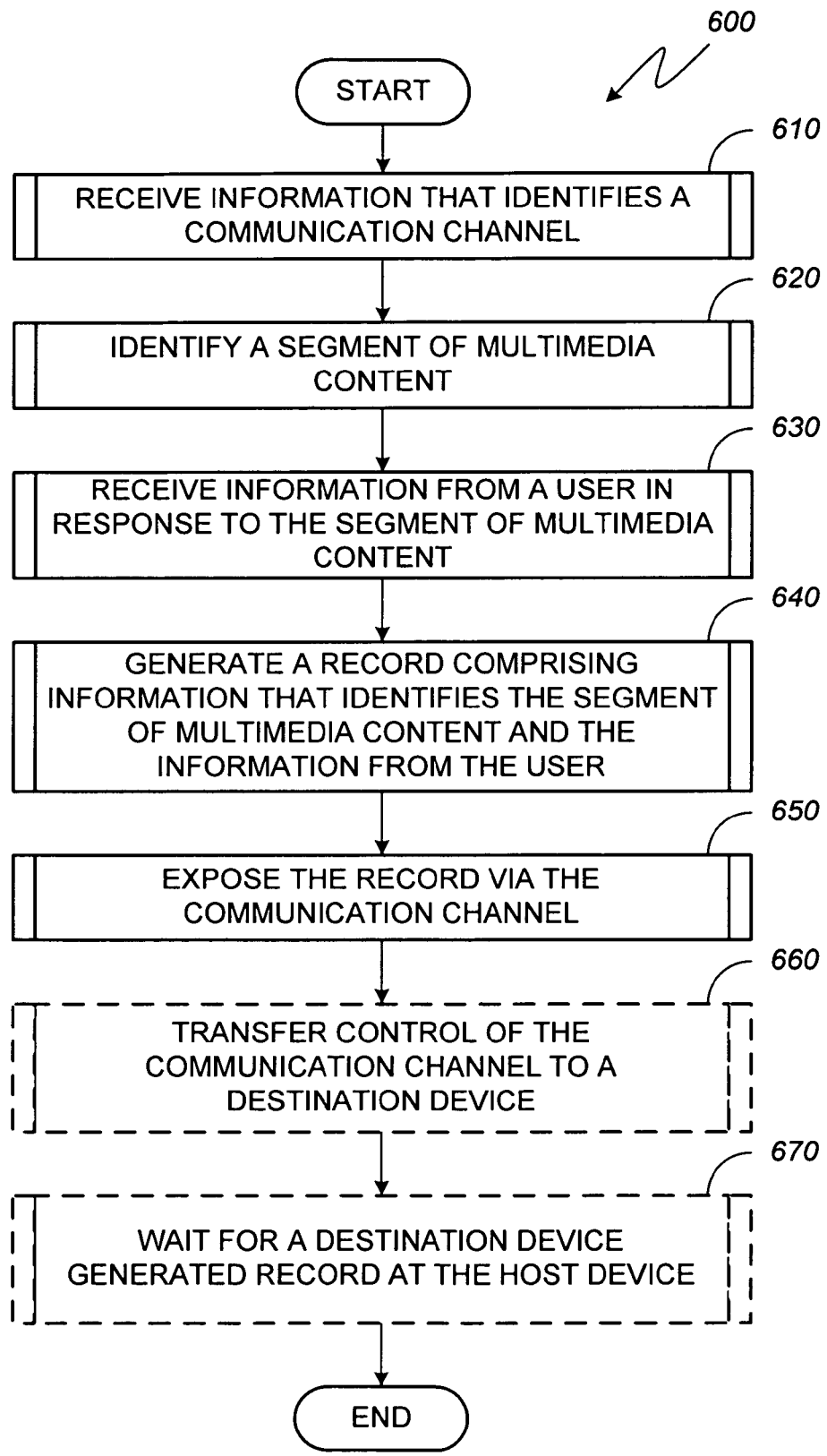
FIG. 6 is a flow diagram illustrating an alternative embodiment of a method for interactive communication.

FIG. 6 is a flow diagram illustrating an embodiment of a method 600 for interactively presenting alternative content. In this regard, each block represents a specified step or function. When embodied in software and/or hardware/firmware, each block represents a module, segment, or portion of code, which comprises one or more executable instructions for implementing the specified function(s). Method 600 begins with block 610 where information that identifies a communication channel is received. In block 620, a segment of multimedia content is identified. Thereafter, in block 630, a user provides information in response to the segment of multimedia content. The user information, as explained above can be audio, text or other symbols, video only or any combination of the various forms of information. The information in whatever form the user chooses is responsive to the segment of multimedia content observed by the user. In block 640, a record comprising information that identifies the segment of multimedia content and the information from the user of the segment is generated. As indicated in block 650, the record is exposed via the communication channel. Method 600 continues with optional block 660 where control of the communication channel is transferred to a destination device. In optional block 670 a host device waits to receive a destination device generated record.

Figure 7:
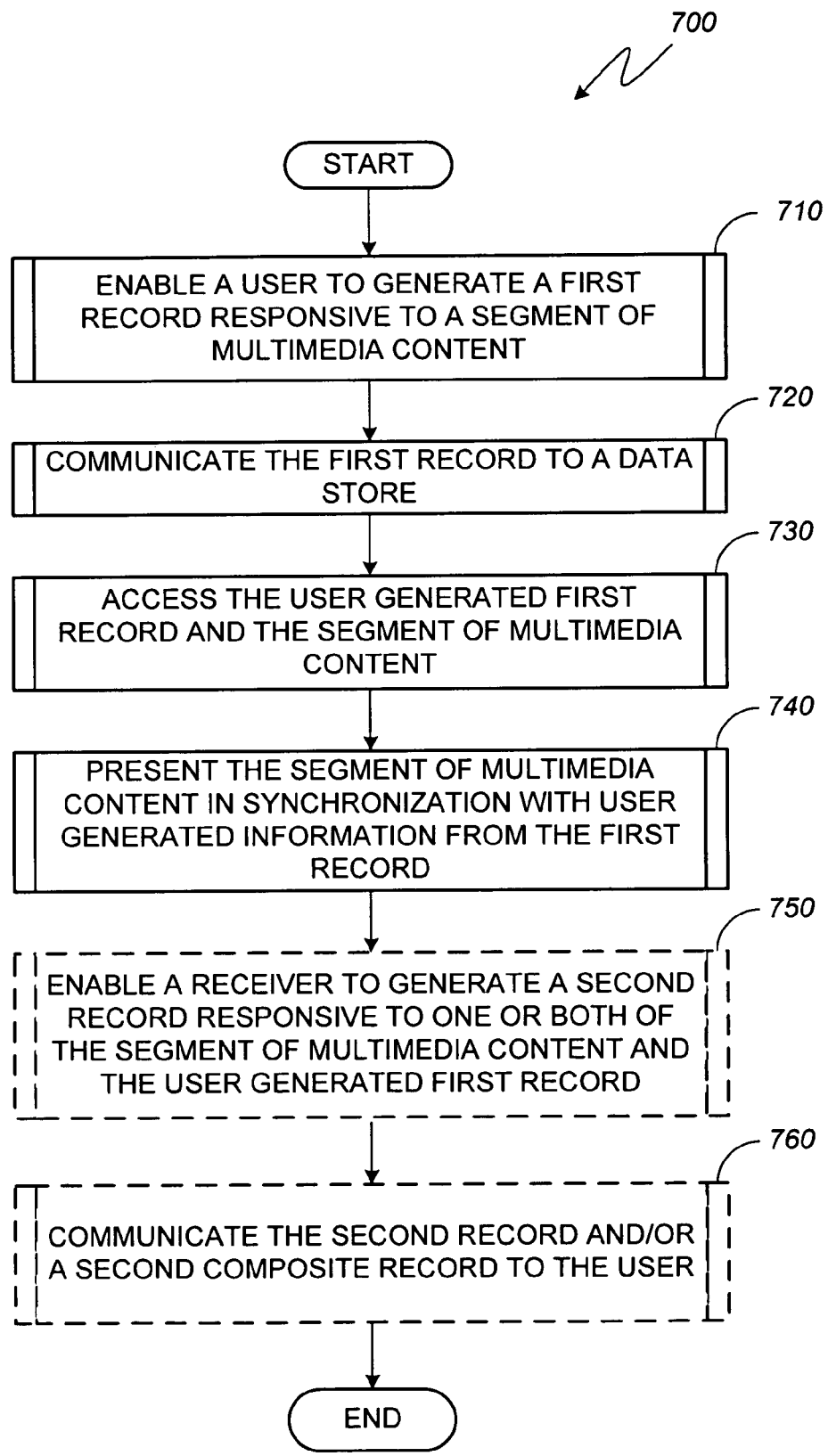
FIG. 7 is a flow diagram illustrating another embodiment of a method for interactive communication.

FIG. 7 is a flow diagram illustrating an alternative embodiment of a method for interactive communication. In this regard, each block represents a specified step or function. When embodied in software and/or hardware/firmware, each block represents a module, segment, or portion of code, which comprises one or more executable instructions for implementing the specified function(s). Method 700 begins with block 710 where a host computer enables a user to generate a first record (i.e., information) responsive to a segment of multimedia content content. In block 720, the first record is communicated to a data store. In block 730, the first record and the segment of multimedia content are accessed. Next, in block 740, the segment of multimedia content and the user generated information from the first record are presented in synchronization. Method 700 continues with optional block 750 where a receiver of the segment of multimedia content and the user generated information generates a second record in response to one or both of the segment of multimedia content and the user generated first record. In optional block 760 the second record is communicated to the user. The second record may be associated with a segment of multimedia content different from the segment of multimedia content presented in block 740 or the segment of multimedia content may be the same as that annotated by the user.

Operational software programs that may be used by host computer 110, as well as operational software that may be used in conjunction with controllers, monitors, destination computer 180, among other devices within or that interface with multimedia system 100, which comprise an ordered listing of executable instructions for implementing logical functions, can be embodied in any computer-readable medium for use by or in connection with an instruction execution system, apparatus, or device, such as a computer-based system, processor-containing system, or other system that can fetch the instructions from the instruction execution system, apparatus, or device and execute the instructions.

While various embodiments of the apparatuses and methods for interactive communication concerning multimedia content have been described, it will be apparent to those of ordinary skill in the art that many more embodiments and implementations are possible that are within the scope of the accompanying claims. Accordingly, the apparatuses and methods for interactive communication concerning multimedia content are not to be restricted beyond the attached claims and their equivalents.

What is claimed is:

1. An apparatus for use with an output device coupled to receive broadcast multimedia content from a service provider, the apparatus comprising:
   a recorder/player for recording and playing a segment of the broadcast multimedia content received from the service provider;
   an operator interface configured to receive annotation information responsive to observation by a user of the segment of the broadcast multimedia content;
   a record generator coupled to the operator interface and configured to generate a record that identifies the segment of the broadcast multimedia content and includes the annotation information; and
   a network interface coupled to the operator interface and to the record generator, the network interface configured to communicate presence information via a data network that relates to at least one other user of the service provider that is in communication with the data network, and to initiate transmission of an indicator to the at least one other user via the data network, wherein the indicator prompts the at least one other user to initiate reception of the annotation information,
   wherein when the at least one other user does not have a local recording of the segment of the broadcast multimedia content, the segment of the broadcast multimedia content is transmitted to the at least one other user along with the annotation information,
   wherein the operator interface is further configured to generate a list of present users of the service provider based on the presence information and to select the at least one other user of the service provider based on the list of present users of the service provider and further based on a user selection, and
   wherein the network interface is further operable to receive second annotation information from the at least one other user, to determine whether a size of the second annotation information satisfies a threshold, and when the size of the second annotation information satisfies the threshold, to loop the second annotation information until third annotation information is received, wherein the second annotation information is displayable as a transparent overlay over the segment of the broadcast multimedia content.

2. The apparatus of claim 1, wherein the operator interface comprises switches associated with respective alphanumeric symbols.

3. The apparatus of claim 1, wherein the operator interface is coupled to a microphone for communicating audio information.

4. The apparatus of claim 1, wherein the operator interface is coupled to a video camera for communicating video information.

5. The apparatus of claim 1, wherein the record includes an identifier.

6. The apparatus of claim 1, wherein the record includes a timestamp.

7. The apparatus of claim 1, wherein the record includes information responsive to a desired duration.

8. The apparatus of claim 1, further comprising annotation interface logic that when executed by a processor generates a graphical user interface configured to enable the user to enter at least one of text, video, and audio.

9. A method, comprising:
receiving broadcast multimedia content from a service provider;
recording the broadcast multimedia content at a recording device;
playing a segment of the broadcast multimedia content via the recording device;
receiving information that identifies the segment of the broadcast multimedia content;
receiving annotation information from a user in response to observation by the user of the segment of the broadcast multimedia content;
generating a record comprising information that identifies the segment of the broadcast multimedia content and the annotation information;
generating a list of present users of the service provider based on presence information received via a data network;
selecting at least one other user of the service provider based on the list of present users of the service provider and further based on a user selection;
initiating a transmission of an indicator to the at least one other user via the data network, wherein the indicator prompts the at least one other user to initiate reception of the annotation information, wherein, when the at least one other user does not have a local recording of the segment of the broadcast multimedia content, the segment of the broadcast multimedia content is transmitted to the at least one other user along with the annotation information;
receiving second annotation information from the at least one other user, wherein the second annotation information is displayable as a transparent overlay over the segment of the broadcast multimedia content;
determining whether a size of the second annotation information satisfies a threshold; and
when the size of the second annotation information satisfies the threshold, looping the second annotation information until third annotation information is received.

10. The method of claim 9, wherein receiving the annotation information from the user comprises receiving at least one of audio, text, and video annotation information.

11. The method of claim 9, wherein generating the record comprises inserting a content identifier.

12. The method of claim 9, wherein generating the record comprises inserting a timestamp.

13. The method of claim 9, further comprising transferring control of a communication channel from the service provider to a destination device.

14. The method of claim 13, wherein when the communication channel is under the control of the destination device, a host device waits for a message from the destination device.

15. The method of claim 13, wherein when the communication channel is under the control of the destination device, a host device receives the annotation information via the destination device.

16. A computer program product stored on a non-transitory computer-readable medium including computer program logic encoded thereon that, when executed by a processor, causes the processor to:
receive broadcast multimedia content from a service provider;
store the broadcast multimedia content at a recording device;
identify a segment of the broadcast multimedia content;
generate a graphical-user interface that enables a user to provide annotation information in response to observation of the segment of the broadcast multimedia content;
generate a record responsive to both the segment of the broadcast multimedia content and the annotation information;
generate a list of present users of the service provider based on presence information received via a data network;
select at least one other user of the service provider based on the list of present users of the service provider and based on a user selection;
initiate transmission of an indicator to the at least one other user via the data network, wherein the indicator prompts the at least one other user to initiate reception of the annotation information, wherein, when the at least one other user does not have a local recording of the segment of the broadcast multimedia content, the segment of the broadcast multimedia content is transmitted to the at least one other user along with the annotation information;
receive second annotation information from the at least one other user, wherein the second annotation information is displayable as a transparent overlay over the segment of the broadcast multimedia content;
determine whether a size of the second annotation information satisfies a threshold; and
when the size of the second annotation information satisfies the threshold, loop the second annotation information until third annotation information is received.

17. The computer program product of claim 16, wherein the computer program logic is further executable by the processor to:
identify the at least one other user as a potential receiver of the record;
receive an acceptance from the at least one other user in response to the indicator; and
communicate the record to the at least one other user in response to the acceptance.

18. The computer program product of claim 16, wherein the computer program logic is further executable by the processor to transfer control of a communication channel to a destination device.

19. The computer program product of claim 16, wherein the annotation information comprises at least one of audio, text, and video information.

20. The computer program product of claim 16, wherein the record further comprises at least one of an identifier and a timestamp.

21. A method, comprising:
receiving broadcast multimedia content at a set-top box device from a service provider;
receiving annotation information from a user in response to observation by the user of a segment of the broadcast multimedia content;

generating a record comprising information that identifies the segment of the broadcast multimedia content and the annotation information;

initiating a transmission of an indicator to at least one other user, wherein the indicator prompts the at least one other user to initiate reception of the annotation information, wherein when the at least one other user does not have a local recording of the segment of the broadcast multimedia content, the segment of the broadcast multimedia content is transmitted to the at least one other user along with the annotation information;

receiving second annotation information from the at least one other user, wherein the second annotation information is displayable as a transparent overlay over the segment of the broadcast multimedia content;

determining whether a size of the second annotation information satisfies a threshold; and when the size of the second annotation information satisfies the threshold, looping the second annotation information until third annotation information is received.

22. The method of claim 21, further comprising playing back the second annotation information without looping the second annotation information when the size of the second annotation information does not satisfy the threshold.

23. The method of claim 21, wherein the threshold is retrieved from a user profile that is stored at the set-top box device.

24. The method of claim 21, further comprising enabling control over presentation of the annotation information and the segment of the broadcast multimedia content when the annotation information includes both audio information and visual information.

25. The method of claim 24, wherein control over presentation of the annotation information and the segment of the broadcast multimedia content comprises muting the audio information associated with the annotation, muting an audio portion of the segment of the broadcast multimedia content, muting both the audio information associated with the annotation and the audio portion of the segment of the broadcast multimedia content, and simultaneously playing back both the audio information associated with the annotation and the audio portion of the segment of the broadcast multimedia content.

* * * * *